United States Patent Office 2,906,731
Patented Sept. 29, 1959

2,906,731

BUTYL RUBBER AND PHOSPHOROTHIOATES

Rutherford B. Hill, St. Albans, W. Va., and Dudley B. Merrifield, Basking Ridge, N.J., assignors to Monsanto Chemical Company, St. Louis, Mo., a corporation of Delaware No Drawing. Application April 3, 1957
Serial No. 650,300

15 Claims. (Cl. 260—45.75)

This invention relates to a process of stabilizing high molecular weight copolymers containing low controlled amounts of chemical unsaturation and particularly relates to stabilizing Butyl rubber.

Butyl rubber is well recognized and commonly employed generic name applied to a variety of elastic copolymers of isobutylene and small quantities of diolefins. The diolefins are usually selected so to produce a final product which possesses only a small percentage of the unsaturation of natural rubber. The content of combined diolefin hydrocarbon is not greater than 15%. It has been reported that the minimum amount of a multi-olefin which is significant and useful is about 0.2%. Due to its low unsaturation, Butyl rubber is very stable to oxidation but in the uncured state it depolymerizes during processing and storage. The results are a very tacky, soft product and serious loss of tensile strength in the cured polymers. Furthermore, the degradation may be so severe that it is no longer possible to cure to a solid material having a definite tensile strength. Some lapse of time between the manufacture and use is inevitable. Often the rubber must be stored for considerable lengths of time.

According to the present invention it has been found that the addition to Butyl rubber of non aromatic phosphorothioates increases the storage life of the polymers without discoloring them or other detrimental effect either to the raw polymer or to the cured product. The phosphorothioates may be represented by the structure

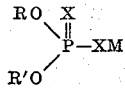

where R and R' represent non aromatic organic substituents, as for example alkyl, alicyclic, alkenyl, and includes aryl substituted groups, as for example benzyl, but excludes radicals in which a carbon atom which is part of an aromatic ring is attached directly to the oxygen; X represents oxygen or sulfur, at least one being sulfur, and M represents hydrogen or a salt forming constituent. The salt forming group includes metals, as for example the alkali and alkaline earth metals or heavy metals, as for example zinc, cadmium, mercury and lead. Ammonium salts are particularly useful as are amine salts. Examples of amines which may be present as salt forming substituents are 2,2',2"-nitrilotriethanolamine, triethylamine, t-butylamine, hexadecylamine, triethylenetetramine, N,N-dimethylaniline, cyclohexylamine, dicyclohexylamine, N-methylcyclohexylamine, N-cyclohexylamine, p-phenetidine, N-cyclohexyl-o-hydroxyaniline, N-2-cyanoethylaniline, N-ethyl-p-phenetidine, dibutylamine, diamylamine, dioctylamine, diethanolamine and morpholine.

One method for demonstrating the effectiveness of phosphorothioates for stabilizing Butyl rubber is to incorporate 0.1% thereof into the Butyl rubber on a standard 6 x 12 rubber mill with the mill rolls heated to the temperature of 300° F. The degree of depolymerization is determined by measuring the viscosity of samples taken from the mill at half hour intervals. As a minimum requirement the viscosity determined on a Mooney plastometer should be at least 50 after one hour milling [ML-8(212F)]. Unprotected stock will be very soft and tacky after this treatment. The instrument is described by Melvin Mooney, Industrial and Engineering Chemistry, Analytical Edition, March 15, 1934, pages 147–151, and the test procedure follows ASTM Method D–927.

One series of tests was carried out employing a copolymer of isobutylene and isoprene containing no stabilizer. The copolymer had an unsaturation within a range of 1.5 to 2.0 mole percent. The mole percent of unsaturation is defined as the number of diolefin units per 100 of monomer units in the polymer chain. It may be noted that by this definition the percentage of unsaturation of natural rubber would be 100%. After milling for one-half hour at 300° F. the Mooney plasticity of the unprotected stock was only 15. The plasticity of the stock containing 0.1% of phenyl-beta-naphthylamine was 55 whereas the Mooney plasticity of the stock containing 0.1% of either cadmium O,O-diisopropyl phosphorodithioate or ammonium O,O-diisopropyl phosphorodithioate was 65.

Typical examples of other stabilizers which may be used in the practice of the invention include the following:

Ammonium O,O-dibutyl phosphorodithioate
Ammonium O,O-diethyl phosphorodithioate
Ammonium O,O-dimethyl phosphorodithioate
Ammonium O,O-dipropyl phosphorodithioate
Ammonium O,O-diethyl phosphorothioate
Ammonium O,O-diisopropyl phosphorothioate
Ammonium O,O-dimethyl phosphorothioate
Ammonium O,O-dicyclohexyl phosphorodithioate
Aluminum O,O-dioctyl phosphorodithioate
Antimony O,O-bis(4-methylpentyl)phosphorodithioate
Barium O,O-dicapryl phosphorodithioate
Barium O,O-dilauryl phosphorodithioate
Barium O,O-dioctyl phosphorodithioate
Barium O,O-ditetradecyl phosphorodithioate
Barium O,O-diundecyl phosphorodithioate
Cadmium O,O-bis(4-methylpentyl) phosphorodithioate
Calcium O,O-diamyl phosphorothioate
Calcium O,O-dilauryl phosphorothioate
Calcium O,O-dioctyl phosphorothioate
Calcium O,O-dioctadecyl phosphorodithioate
Calcium O,O-dioctyl phosphorodithioate
Chromium O,O-dicetyl phosphorothioate
Copper (II) O,O-diisopropyl phosphorodithioate
Lead O,O-bis(4-methylpentyl) phosphorodithioate
Lead O,O-dioctyl phosphorothioate
Magnesium O,O-dicetyl phosphorothioate
magnesium O,O-dioctyl phosphorothioate
Nickel (II) O,O-dibutyl phosphorodithioate
Nickel (II) O,O-diethyl phosphorodithioate
Nickel (II) O,O-diisopropyl phosphorodithioate
Potassium O,O-diisopropyl phosphorodithioate
Stannous O,O-diisopropyl phosphorodithioate
Tin O,O-bis(4-methylpentyl) phosphorodithioate
Tin O,O-dicetyl phosphorodithioate
Tin O,O-dilauryl phosphorodithioate Tin O,O-dioctyl phosphorodithioate
Zinc O,O-bis(9,10-dichlorooctadecyl) phosphorodithioate
Zinc O,O-bis(1,3-dimethylbutyl) phosphorodithioate
Zinc O,O-bis(2-ethylhexyl) phosphorodithioate
Zinc O,O-bis(4-methylpentyl) phosphorodithioate
Zinc O,O-diisopropyl phosphorodithioate
Zinc O,O-ditridecyl phosphorodithioate
Zinc O,O-diamyl phosphorodithioate
Zinc O,O-dicapryl phosphorodithioate
Zinc O,O-dilauryl phosphorodithioate
Zinc O,O-dioctadecyl phosphorodithioate
Zinc O,O-dioctyl phosphorodithioate
Zinc O,O-dioctyl phosphorothioate
O,O-dibutyl S-hydrogen phosphorodithioate
O,O-diethyl S-hydrogen phosphorodithioate
O,O-diisopropyl S-hydrogen phosphorodithioate
O,O-dipropyl S-hydrogen phosphorodithioate
O,O-ditridecyl S-hydrogen phosphorodithioate
O,O-diamyl S-hydrogen phosphorodithioate
O,O-dilauryl S-hydrogen phosphorodithioate
O,O-dioleyl S-hydrogen phosphorodithioate As further examples demonstrating the effectiveness of the new stabilizers, 825 grams of the Butyl rubber described above was milled on the different rolls of a 6 x 12 mill by passing it through the rolls ten times at a setting of 0.040±0.005 inch. The temperature of the roll surfaces was maintained between 30 and 40° C. From the blended rubber 200 gram samples were weighed out and to each sample was added 0.2 gram of the phosphorothioate by milling it into the rubber at 30 to 40° C.

Any trapped air was then removed from a 20 gram sample by pressing the Butyl rubber containing the stabilizer between two 24 gauge aluminum sheets 18 inches square in a hydraulic press at a temperature of 293° F. The stock was pressed three times and allowed to flor for ten seconds each time and was folded back upon itself four times after each pressing. The stock was then formed into a thin, circular test sheet by molding in a mold made by cutting a 6 inch diameter hole in a 22 gauge aluminum sheet 10 inches square. The mold and rubber stock were sandwiched between two 24 gauge aluminum sheets and were allowed to remain in a press under pressure for two minutes. The formed test sheet was then placed over a circular aluminum disc slightly smaller than the inside diameter of a one gallon can.

Each test sheet was sealed in a one gallon can and aged by placing the can in a forced draft oven at 150° C. for different periods of time. At the end of the aging period one-half inch strips were cut from the sheet and rolled into cylinders one-half inch in diameter and the cylinders were placed into the cavities of a ¾″ I.D. mold ½″ deep containing a ⅛″ overflow ring 1/16″ deep. The mold containing the stock was placed between two 24 gauge aluminum sheets in a hydraulic press at 293° F. The mold was allowed to remain in the hot press for two minutes and the press cooled and pressure released and the cold mold removed. After stripping the aluminum sheet from the mill and removing the pellets, the pellets were allowed to remain for ½ hour at room temperature, then placed between two sheets of cellophane and compressed between the plates of a Williams plastometer at room temperature. At the end of exactly one minute the compression was read on the dial to the nearest thousandth of an inch. The Williams plastometer, which is in reality a plastometer press, is described by Williams, Industrial and Engineering Chemistry, vol. 16, page 362 (1924)—see also Krall, ibid., vol. 16, page 922 (1924). It has a movable upper weighted plate connected to a gauge graduated in 1/1000 inches so that the distance between the upper and lower plates of the press can be measured accurately.

In the table below typical results are recorded employing the phosphorothioates as stabilizers. The higher figures indicate the lesser degrees of depolymerization.

Table

| Stabilizer | Height of .375″ pellet in inches after aging @ 150° C. | | |
|---|---|---|---|
| | 0 hrs. | 4 hrs. | 6 hrs. |
| None | .211 | (1) | (1) |
| Phenyl-beta-naphthylamine | .226 | .174 | .153 |
| Cadmium O,O-diisopropyl phosphorodithioate | .226 | .203 | .204 |
| Ammonium O,O-diisopropyl phosphorodithioate | .216 | .196 | .201 |
| Copper (II) O,O-diisopropyl phosphorodithioate | .216 | .220 | .217 |
| Zinc O,O-bis(1,3-dimethylbutyl) phosphorodithioate | .226 | .175 | .151 |
| Ammonium O,O-diethyl phosphorodithioate | .222 | .194 | .201 |
| Zinc O,O-diisopropyl phosphorodithioate | .216 | .194 | .188 |
| Ammonium O,O-dicyclohexyl phosphorodithioate | .222 | .176 | .163 |

1 Tacky and decomposed.

These data show that the phosphorothioates are extremely effective for preventing the degradation of Butyl rubber and inhibiting depolymerization on heating. While a concentration of 0.1% is very effective, useful results are obtained with even lower amounts. In general 0.01%–5% by weight of the rubber comprise the proportions to be used. The expression "Butyl rubber" designates a copolymer of 85 to about 99% by weight isoolefin of 4 to 7 carbon atoms and 15 to about 1% by weight of a conjugated multiolefin containing 4 to 10 carbon atoms. The preparation of the Butyl type rubbers is fully described in the literature. The preferred isoolefin is isobutylene and preferred multiolefin is isoprene. Other suitable multiolefins include butadiene, dimethyl butadiene and piperylene.

The incorporation of the phosphorothioates may be carried out by adding the compound per se or in solution, suspension or emulsion to the Butyl rubber. The rubber may be in massed or granular form or dispersed in aqueous medium. Protection of the rubber may be accomplished by applying the phosphorothioate to the surface thereof as well as by incorporating it through milling or similar mixing. Of course, it is desirable to treat the rubber with the stabilizer soon after completion of the polymerization, preferably before drying and further processing takes place. The phosphorothioates may be used in combination with other stabilizers, as for example phenyl-beta-naphthylamine, alkyl phenol sulfides, alkyl hydroquinones and ketone-amine condensation products. Moreover, mixtures of different phosphorothioates may be employed.

It is intended to cover all changes and modifications of the examples of the invention herein chosen for purposes of disclosure which do not constitute departures from the spirit and scope of the invention.

What is claimed is:

1. The process of stabilizing a rubbery copolymer of at least 85% isoolefin of 4 to 7 carbon atoms and a minor amount of a conjugated diene hydrocarbon containing 4 to 10 carbon atoms which comprises incorporating therein an effective concentration within the range of 0.01%–5% of the copolymer of a stabilizer consisting of a phosphorothioate represented by the structure $$\begin{array}{c} RO \\ \phantom{RO}\diagdown \\ \phantom{RO}\phantom{\diagdown}P \\ \phantom{RO}\diagup \\ R'O \end{array} \begin{array}{c} X \\ \| \\ \text{—XM} \end{array}$$

where R and R' are organic radicals containing less than 19 carbon atoms selected from a group consisting of alkyl, alicyclic, alkenyl and aralkyl radicals, X is selected from a group consisting of oxygen and sulfur, at least one being sulfur, and M is selected from a group consisting of hydrogen, ammonium, substituted ammonium and metal.

2. The process of stabilizing a rubbery copolymer of at least 85% isobutylene and a minor amount of a conjugated diene hydrocarbon containing 4 to 10 carbon atoms which comprises incorporating therein an effective concentration within the range of 0.01% to 5% of the copolymer of a stabilizer consisting of a metal O,O-dialkyl phosphorodithioate in which each alkyl group contains at least 2 but not more than 6 carbon atoms.

3. The process of stabilizing a rubbery copolymer of at least 85% isobutylene and a minor amount of a conjugated diene hydrocarbon containing 4 to 10 carbon atoms which comprises incorporating therein are effective concentration within the range of 0.01% to 5% of the copolymer of a stabilizer consisting of an ammonium O,O-dialkyl phosphorodithioate in which each alkyl group contains at least 2 but not more than 6 carbon atoms.

4. The process of stabilizing a rubbery copolymer of at least 85% isobutylene and a minor amount of a conjugated diene hydrocarbon containing 4 to 10 carbon atoms which comprises incorporating therein an effective concentration within the range of 0.01% to 5% of the copolymer of a stabilizer consisting of ammonium O,O-dicyclohexyl phosphorodithioate.

5. The process of stabilizing a rubbery copolymer of at least 85% isobutylene and a minor amount of a conjugated diene hydrocarbon containing 4 to 10 carbon atoms which comprises incorporating therein an effective concentration within the range of 0.01% to 5% of the copolymer of a stabilizer consisting of cadmium O,O-diisopropyl phosphorodithioate.

6. The process of stabilizing a rubbery copolymer of at least 85% isobutylene and a minor amount of a conjugated diene hydrocarbon containing 4 to 10 carbon atoms which comprises incorporating therein an effective concentration within the range of 0.01% to 5% of the copolymer of a stabilizer consisting of ammonium O,O-diisopropyl phosphorodithioate.

7. The process of stabilizing a rubbery copolymer of at least 85% isobutylene and a minor amount of a conjugated diene hydrocarbon containing 4 to 10 carbon atoms which comprises incorporating therein an effective concentration within the range of 0.01% to 5% of the copolymer of a stabilizer consisting of zinc O,O-bis(1,3-dimethylbutyl) phosphorodithioate.

8. The composition comprising a copolymer composed of at least 85% isoolefin of 4 to 7 carbon atoms and a minor amount of a conjugated diene hydrocarbon containing 4 to 10 carbon atoms having incorporated therein a small amount within the range of 0.01% to 5% of the copolymer sufficient to inhibit depolymerization of a stabilizer consisting of a phosphorothioate represented by the structure

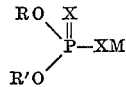

where R and R' are organic radicals containing less than 19 carbon atoms selected from a group consisting of alkyl, alicyclic, alkenyl and aralkyl radicals, X is selected from a group consisting of oxygen and sulfur, at least one being sulfur, and M is selected from a group consisting of hydrogen, ammonium, substituted ammonium and metal.

9. The composition comprising a copolymer composed of at least 85% isobutylene and a minor amount of a conjugated diene hydrocarbon of 4 to 10 carbon atoms having incorporated therein a small amount within the range of 0.01% to 5% sufficient to inhibit depolymerization of a stabilizer consisting of a metal O,O-dialkyl phosphorodithioate in which each alkyl group contains at least 2 but not more than 6 carbon atoms.

10. The composition comprising a copolymer composed of at least 85% isobutylene and a minor amount of a conjugated diene hydrocarbon of 4 to 10 carbon atoms having incorporated therein a small amount within the range of 0.01% to 5% sufficient to inhibit depolymerization of a stabilizer consisting of an ammonium O,O-dialkylphosphorodithioate in which each alkyl group contains at least 2 but not more than 6 carbon atoms.

11. The composition comprising a copolymer composed of at least 85% isobutylene and a minor amount of a conjugated diene hydrocarbon of 4 to 10 carbon atoms having incorporated therein a small amount within the range of 0.01% to 5% sufficient to inhibit depolymerization of a stabilizer consisting of ammonium O,O-dicyclohexyl phosphorodithioate.

12. The composition comprising a copolymer composed of at least 85% isobutylene and a minor amount of a conjugated diene hydrocarbon of 4 to 10 carbon atoms having incorporated therein a small amount within the range of 0.01% to 5% sufficient to inhibit depolymerization of a stabilizer consisting of cadmium O,O-diisopropyl phosphorodithioate.

13. The composition comprising a copolymer composed of at least 85% isobutylene and a minor amount of a conjugated diene hydrocarbon of 4 to 10 carbon atoms having incorporated therein a small amount within the range of 0.01% to 5% sufficient to inhibit depolymerization of a stabilizer consisting of ammonium O,O-diisopropyl phosphorodithioate.

14. The composition comprising a copolymer composed of at least 85% isobutylene and a minor amount of a conjugated diene hydrocarbon of 4 to 10 carbon atoms having incorporated therein a small amount within the range of 0.01% to 5% sufficient to inhibit depolymerization of a stabilizer consisting of zinc O,O-bis(1,3-dimethylbutyl) phosphorodithioate.

15. The composition comprising a copolymer composed of at least 85% isobutylene and a minor amount of a conjugated diene hydrocarbon of 4 to 10 carbon atoms having incorporated therein a small amount within the range of 0.01% to 5% sufficient to inhibit depolymerization of a stabilizer consisting of a heavy metal salt of a dialkylphosphorodithioate in which each alkyl group contains at least 2 but not more than 6 carbon atoms.

References Cited in the file of this patent

UNITED STATES PATENTS

| | | |
|---|---|---|
| 2,538,355 | Davis et al. | Jan. 16, 1951 |
| 2,739,123 | Kennerly et al. | Mar. 20, 1956 |

OTHER REFERENCES

Barron: Modern Synthetic Rubbers, 3rd edition, 1949, pub. by Chapman and Hall, 37 Essex St. W. C. 2, London, pp. 470–473. (Copy in Sci. Library.)